(12) United States Patent
Fujiwara

(10) Patent No.: US 7,733,583 B2
(45) Date of Patent: Jun. 8, 2010

(54) SMALL-DIAMETER OBJECTIVE OPTICAL SYSTEM

(75) Inventor: Masato Fujiwara, Hachioji (JP)

(73) Assignee: Olympus Corporation, Tokyo (JP)

( * ) Notice: Subject to any disclaimer, the term of this patent is extended or adjusted under 35 U.S.C. 154(b) by 17 days.

(21) Appl. No.: 12/175,960

(22) Filed: Jul. 18, 2008

(65) Prior Publication Data

US 2009/0052062 A1 Feb. 26, 2009

(30) Foreign Application Priority Data

Aug. 22, 2007 (JP) .............................. 2007-216110

(51) Int. Cl.
*G02B 9/12* (2006.01)
(52) U.S. Cl. .................................... 359/784
(58) Field of Classification Search ................. 359/784, 359/791, 792
See application file for complete search history.

(56) References Cited

U.S. PATENT DOCUMENTS

2006/0215282 A1 9/2006 Hirata

FOREIGN PATENT DOCUMENTS

| JP | 10-260362 | | 9/1998 |
| JP | 2006-119300 | * | 5/2006 |
| JP | 2006119300 | | 5/2006 |

OTHER PUBLICATIONS

European Search report for 08 012 390.4-1234.

* cited by examiner

*Primary Examiner*—Joseph Martinez
(74) *Attorney, Agent, or Firm*—Pillsbury Winthrop Shaw Pittman, LLP

(57) ABSTRACT

Reducing the outer diameter and effectively correcting various aberrations realizes a small-diameter objective optical system suitable for in vivo observation with a high numerical aperture. The invention provides a small-diameter objective optical system comprising, in order from an object plane a first lens group with positive refractive power, including at least one plano-convex lens whose convex surface faces an image plane; a second lens group with positive refractive power, including at least one concave lens; and a third lens group including a cemented lens of which a cemented surface has negative refractive power. The focal length of the third lens group is larger than the focal length of the first lens group.

3 Claims, 9 Drawing Sheets

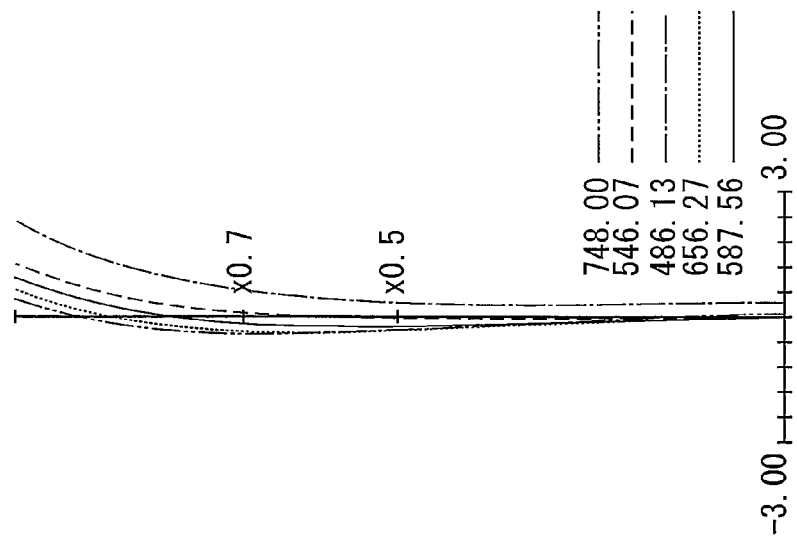
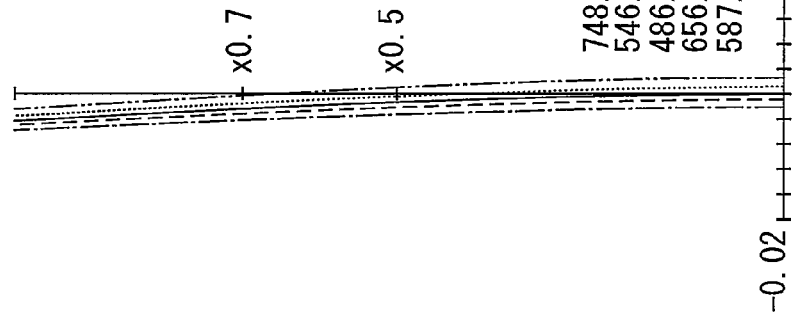

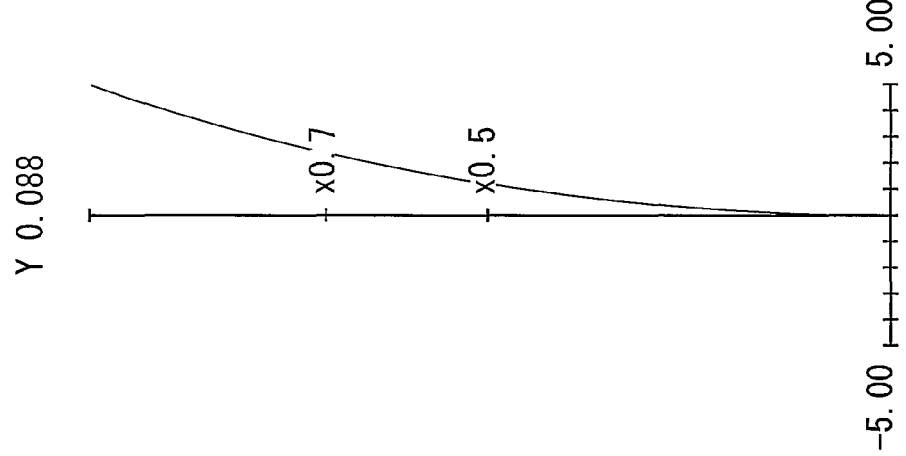
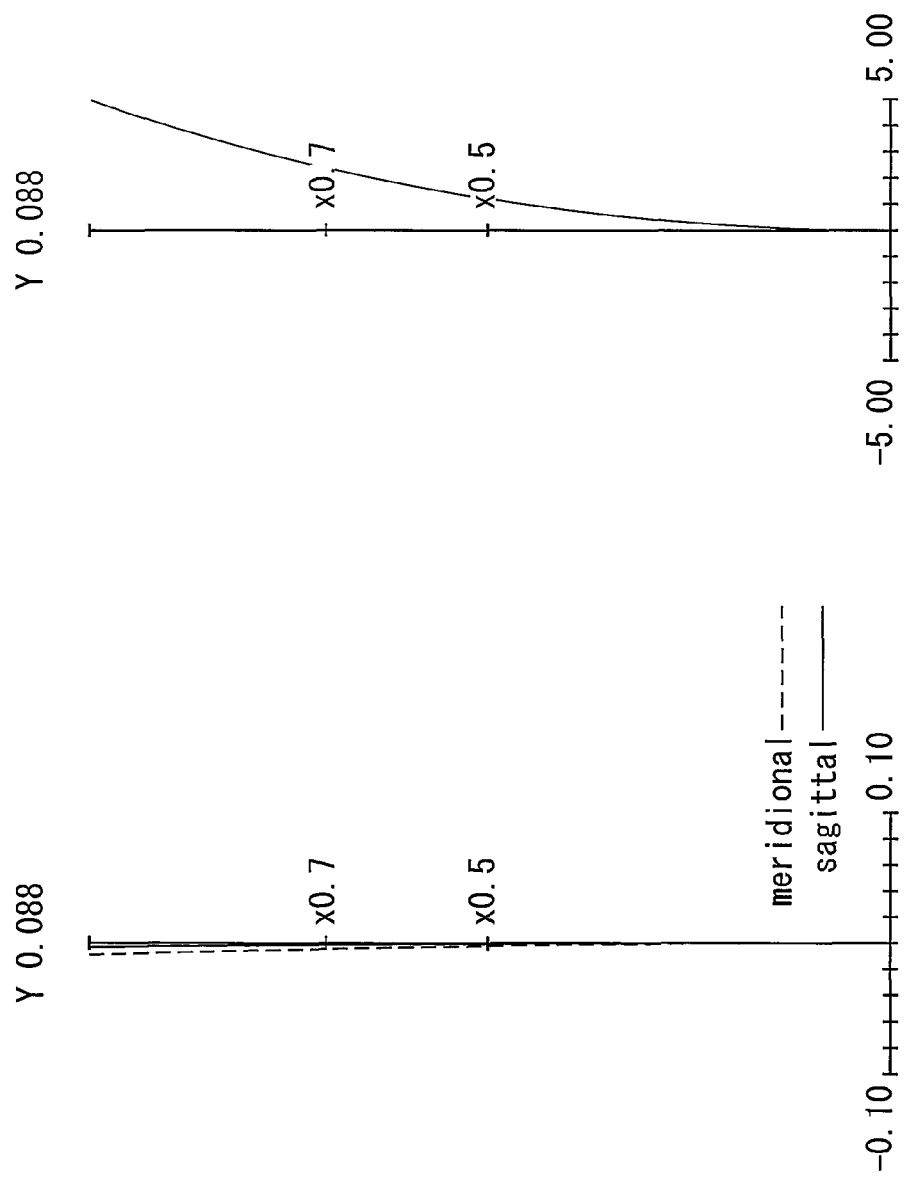

SMALL-DIAMETER OBJECTIVE OPTICAL SYSTEM

BACKGROUND OF THE INVENTION

1. Field of the Invention

The present invention relates to objective optical systems used in applications such as investigating and imaging of cellular function, and more particularly relates to a small-diameter objective optical system suitable for in vivo examination of animals such as mammals.

This application is based on Japanese Patent Application No. 2007-216110, the content of which is incorporated herein by reference.

2. Description of Related Art

At present, a method for observing the behavior of molecules in biological cells and tissue labelled with a dye or fluorescent marker with a fluorescence microscope, a confocal laser-scanning microscope or the like is used.

The behavior of molecules in a living mammalian organism, such as a mouse, sometimes differs from that in culture, and therefore, observation of biological tissue and cells is carried out while the specimen is alive (in vivo). (For example, see Japanese Unexamined Patent Application, Publication No. 2006-119300.)

With conventional microscopes, such as laser-scanning confocal microscopes, it is not assumed that observation of various internal organs of small laboratory animals, such as rats and mice, will be performed in vivo. In examining the interior of a living organism, because the diameter of the objective lens in a conventional microscope is large, it is necessary to perform examination by first making a large incision in the organism. However, making a large incision is highly invasive to the organism, and therefore, it is not possible to carry out observation for a long period of time.

Furthermore, with the objective optical system in Japanese Unexamined Patent Application, Publication No. 2006-119300, although the tip diameter is small, the degree of invasiveness is still high when observing a site deep inside the brain etc. of a mouse. In other words, to observe the organs of a small laboratory animal, it is necessary to make an incision in the skin or muscle tissue, or to drill a hole in the skull to expose the internal organ. However, because the size of the objective lens to be disposed close to the observation site is large compared with the small laboratory animal or the observation target, when observing an internal organ etc. it is necessary to make a large incision in the skin or muscle tissue or to make a large hole. In such a case, although it is possible to carry out observation directly after making the incision or after drilling the hole, significant damage will be caused to the small laboratory animal. Therefore, it is difficult to carry out time-lapse observation over a long period of time. One approach that has been considered is to suture the specimen after observation and to make another incision at the next observation; however, if damage is caused to the small laboratory animal, it is difficult to perform observation under normal conditions over time, which poses a problem.

BRIEF SUMMARY OF THE INVENTION

The present invention has been conceived in light of the circumstances described above, and an object thereof is to provide an objective optical system that can carry out in vivo observation of biological tissue, such as cells and muscle tissue, or various internal organs, such as the heart and liver, and particularly brain tissue, of mammals, including small laboratory animals, over a comparatively long period of time with minimal invasiveness.

In order to realize the object described above, the present invention provides the following solutions.

The present invention provides a small-diameter objective optical system comprising, in order from an object plane, a first lens group with positive refractive power, including at least one plano-convex lens whose convex surface faces an image plane; a second lens group with positive refractive power, including at least one concave lens; and a third lens group including a cemented lens of which a cemented surface has negative refractive power, wherein the focal length of the third lens group is larger than the focal length of the first lens group.

According to this aspect of the present invention, the first lens group with positive refractive power converts a diverging beam to a substantially collimated beam or to a diverging beam close to a substantially collimated beam. Also, because it includes the plano-convex lens whose convex surface faces the image plane, it approaches the aplanatic condition, and thus it is possible to suppress spherical aberration and coma produced in this plano-convex lens.

The second lens group with positive refractive power can expand the substantially collimated beam or the divergent beam close to a substantially collimated beam from the first lens group to a substantially collimated beam with a larger diameter.

The third lens group corrects aberrations such as spherical aberration and coma, as well as chromatic aberration, produced in the first and second lens groups using the cemented surface thereof, which has negative refractive power. Also, by making the focal length of the third lens group larger than the focal length of the first lens group, it is possible to increase the ray height.

In the aspect of the invention described above, it is preferable that conditional expression (1) below be satisfied:

$$0.2 < (F_1 \times h_3)/(F_3 \times h_1) < 0.3 \quad (1)$$

where $F_1$ is the focal length of the first lens group, $F_3$ is the focal length of the third lens group, $h_1$ is a beam diameter of a substantially collimated beam at the first lens group side of the second lens group, and $h_3$ is a beam diameter of a substantially collimated beam at the third lens group side of the second lens group.

If $(F_1 \times h_3)/(F_3 \times h_1)$ is 0.3 or more, when the focal length $F_1$ of the first lens group is increased, the ray height cannot be decreased. On the other hand, when the focal length $F_3$ of the third lens group is reduced, the ray height of the third lens group cannot be increased, and the various aberrations cannot be corrected with the third lens group. If $(F_1 \times h_3)/(F_3 \times h_1)$ is 0.2 or less, the focal length $F_1$ of the first lens group is reduced, and it is difficult to correct the spherical aberration.

In the aspect of the invention described above, it is preferable that conditional expressions (2) and (3) below be satisfied:

$$0.25 < (D_1 \times NA)/(R_1 \times n_1) < 0.35 \quad (2)$$

$$1.5 < d_1/D_1 < 2.5 \quad (3)$$

where $D_1$ is a smallest lens diameter in the first lens group,

NA is a numerical aperture at the object plane side of the small-diameter objective optical system, $R_1$ is a smallest radius of curvature in the first lens group, $n_1$ is a largest refractive index in the first lens group, $d_1$ is a distance from the object plane to an image plane of a lens at the extreme image plane side in the first lens group.

If $(D_1 \times NA)/(R_1 \times n_1)$ is 0.35 or more, the lens diameter $D_1$ increases, making it impossible to realize a small-diameter objective optical system. To decrease the lens diameter $D_1$, the radius of curvature $R_1$ must be reduced; however, when the radius of curvature $R_1$ is reduced, the refractive power of the first lens group is reduced, and spherical aberration is undercorrected. If $(D_1 \times NA)/(R_1 \times n_1)$ is 0.25 or less, the NA at the object plane is reduced, or the radius of curvature $R_1$ is increased; therefore the problem of overcorrected spherical aberration occurs.

If $d_1/D_1$ is 2.5 or more, the distance $d_1$ from the object plane to the image plane of the lens at the extreme image plane side in the first lens group increases. Although the amount of spherical aberration is small, the ray height is high. If $d_1/D_1$ is 1.5 or less, because $d_1$ is small, the diverging beam must be converted to a substantially collimated beam over a short distance, and the amounts of spherical aberration and coma thus increase.

In the aspect of the invention described above, it is preferable that conditional expressions (4), (5), and (6) below be satisfied:

$$10 < |v_{31} - v_{32}| \tag{4}$$

$$0.12 < |n_{31} - n_{32}| < 0.2 \tag{5}$$

$$4 < F_3/R_3 < 5.5 \tag{6}$$

where $v_{31}$ is a d-line Abbe number of a lens with a large Abbe number in the cemented lens of the third lens group, $v_{32}$ is a d-line Abbe number of a lens with a small Abbe number in the cemented lens of the third lens group, $n_{31}$ is a d-line refractive index of the lens with the large Abbe number in the cemented lens of the third lens group, $n_{32}$ is a d-line refractive index of the lens with the small Abbe number in the cemented lens of the third lens group, $F_3$ is the focal length of the third lens group, and $R_3$ is a radius of curvature of the cemented surface in the cemented lens of the third lens group.

If $|v_{31} - v_{32}|$ is 10 or less, the difference between the Abbe numbers in the cemented lens is small, and it is thus difficult to correct chromatic aberrations.

If $|n_{31} - n_{32}|$ is 0.12 or less, the radius of curvature of the cemented surface is small, and lens processing becomes difficult. If $|n_{31} - n_{32}|$ is 0.2 or more, the radius of curvature of the cemented surface is large, and correction of spherical aberration and coma becomes difficult.

If $F_3/R_3$ is 4 or less, the focal length $F_3$ of the third lens group is small, and it is thus not possible to reduce the ray height in the third lens group. Alternatively, because the radius of curvature $R_3$ of the cemented surface of the cemented lens in the third lens group is large, a problem occurs in that it is not possible to correct aberrations produced in the first and second lens groups. If $F_3/R_3$ is 5.5 or more, the radius of curvature $R_3$ of the cemented surface of the cemented lens in the third lens group is small, and therefore, the problem of overcorrection of spherical aberration and coma occurs.

According to the present invention, it is possible to carry out in vivo observation of biological tissue, such as cells and muscle tissue, or various internal organs, such as the heart and liver, and particularly brain tissue, of mammals, including small laboratory animals, over a comparatively long period of time with minimal invasiveness.

BRIEF DESCRIPTION OF THE SEVERAL VIEWS OF THE DRAWINGS

FIG. 5A is an aberration diagram of the small-diameter objective optical system of Example 1, showing spherical aberration.

FIG. 5B is an aberration diagram of the small-diameter objective optical system of Example 1, showing the amount of the offense against the sine condition.

FIG. 5C is an aberration diagram of the small-diameter objective optical system of Example 1, showing astigmatism.

FIG. 5D is an aberration diagram of the small-diameter objective optical system of Example 1, showing distortion.

DETAILED DESCRIPTION OF THE INVENTION

An embodiment of a small-diameter objective optical system 1 of the present invention is described below with reference to FIG. 1.

A small-diameter objective optical system 1 according to this embodiment is formed of a first lens group $G_1$, a second lens group $G_2$, and a third lens group $G_3$, disposed in this order from an object plane.

The first lens group $G_1$ is formed of a plano-convex lens $L_1$ whose convex surface faces an image plane and a convex-plano lens $L_2$ whose convex surface faces the object plane. The first lens group $G_1$ has positive refractive power on the whole.

The second lens group $G_2$ is formed of a cemented lens including a plano-concave lens $L_3$ whose concave surface faces the image plane and a convex-plano lens $L_4$ whose convex surface faces the object plane; a cemented lens including a concave-plano lens $L_5$ whose concave surface faces the object plane and a plano-convex lens $L_6$ whose convex surface faces the image plane; a cemented lens including a plano-convex lens $L_7$ whose convex surface faces the image plane and a concave-plano lens $L_8$ whose concave surface faces the object plane; and a plano-convex lens $L_9$ whose convex surface faces the image plane.

The third lens group $G_3$ is formed of a cemented lens with negative refractive power, including a plano-concave lens $L_{10}$ whose concave surface faces the image plane and a convex-plano lens $L_{11}$ whose convex surface faces the object plane; a convex-plano lens $L_{12}$ whose convex surface faces the object plane; a cemented lens including a plano-convex lens $L_{13}$ whose convex surface faces the image plane and a concave-plano lens $L_{14}$ whose concave surface faces the object plane; and a convex-plano lens $L_{15}$ whose convex surface faces the object plane.

Figure 1:
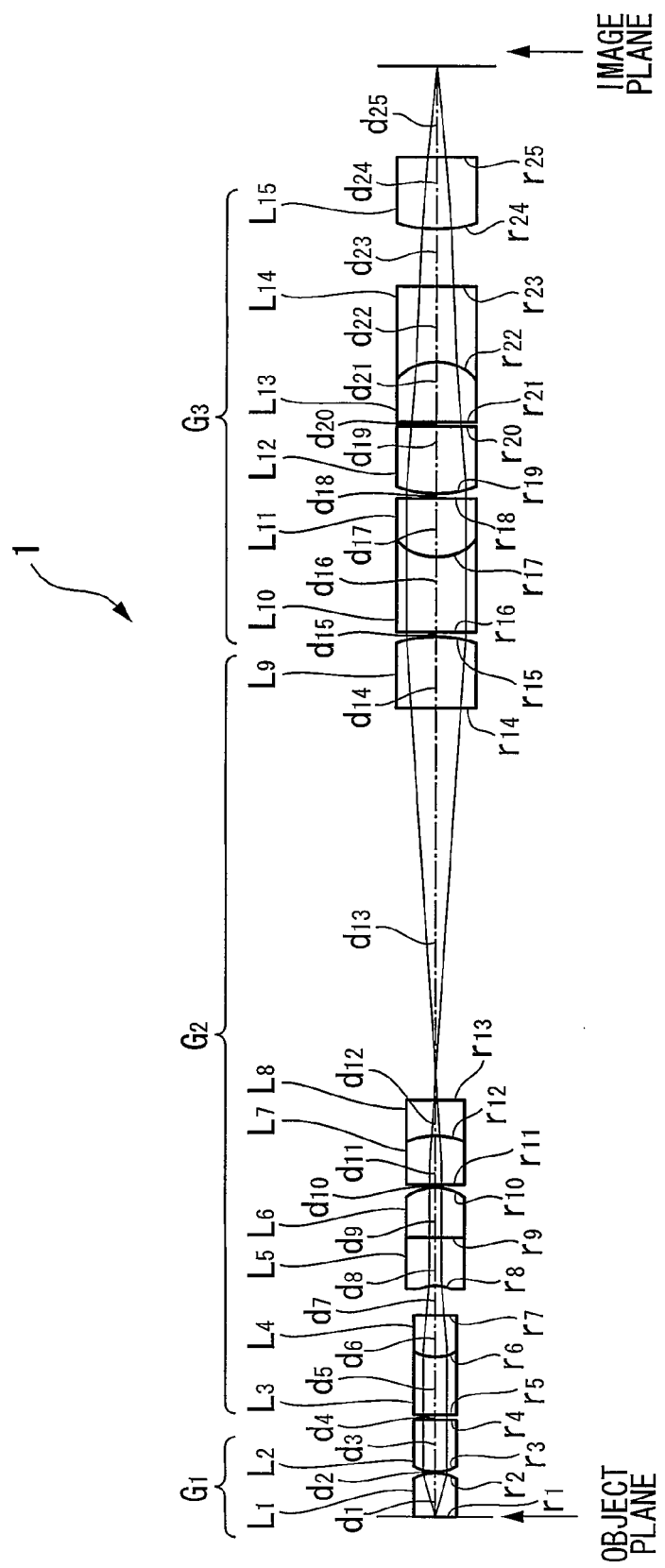
FIG. 1 is a lens diagram of a small-diameter objective optical system according to the present invention.

In the small-diameter objective optical system in FIG. 1, the focal length of the third lens group $G_3$ is larger than the focal length of the first lens group $G_1$.

In this embodiment, the lenses are constructed so as to satisfy conditional expressions (1) to (6) below:

$$0.2 < (F_1 \times h_3)/(F_3 \times h_1) < 0.3 \quad (1)$$

$$0.25 < (D_1 \times NA)/(R_1 \times n_1) < 0.35 \quad (2)$$

$$1.5 < d_1/D_1 < 2.5 \quad (3)$$

$$10 < |v_{31} - v_{32}| \quad (4)$$

$$0.12 < |n_{31} - n_{32}| < 0.2 \quad (5)$$

$$4 < F_3/R_3 < 5.5 \quad (6)$$

Here, $F_1$ is the focal length of the first lens group $G_1$, $F_3$ is the focal length of the third lens group $G_3$, $h_1$ is the beam diameter of a substantially collimated light beam at the first lens group side of the second lens group $G_2$, $h_3$ is the beam diameter of a substantially collimated light beam at the third lens group side of the second lens group $G_2$, $D_1$ is the smallest lens diameter in the first lens group $G_1$, NA is the numerical aperture at the object plane side of the small-diameter objective optical system, $R_1$ is the smallest radius of curvature in the first lens group $G_1$, $n_1$ is the largest refractive index in the first lens group $G_1$, $d_1$ is the distance from the object plane to the image plane of the lens at the extreme image plane side of the first lens group $G_1$, $v_{31}$ is the d-line Abbe number of the lens with a large Abbe number in the cemented lenses of the third lens group $G_3$, $v_{32}$ is the d-line Abbe number of the lens with a small Abbe number in the cemented lenses of the third lens group $G_3$, $n_{31}$ is the d-line refractive index of the lens with the large Abbe number in the cemented lenses of the third lens group $G_3$, $n_{32}$ is the d-line refractive index of the lens with the small Abbe number in the cemented lenses of the third lens group $G_3$, and $R_3$ is the radius of curvature of the cemented surface of the cemented lens in the third lens group $G_3$.

In the first lens group $G_1$, the image-side convex surface of the plano-convex lens $L_1$ can be made close to the aplanatic condition, which makes it possible to reduce the amount of spherical aberration and coma. Additionally, when the overall focal length of the first lens group is reduced, the amounts of spherical aberration and coma of the first lens group become comparatively large on the whole. However, it is possible to convert a divergent beam from the object plane into a substantially collimated beam or a divergent beam that is close to a substantially collimated beam without increasing the ray height, and the thus obtained beam is guided to the second lens group $G_2$.

The second lens group $G_2$ expands the substantially collimated beam or the divergent beam close to a substantially collimated beam from the first lens group to a substantially collimated beam with an even larger diameter and guides the rays to the third lens group.

Because the third lens group $G_3$ includes the cemented lens having the cemented surface with negative refractive power, it corrects monochromatic aberrations, including spherical aberration and coma, and chromatic aberrations generated in the first and second lens groups.

Moreover, the ray height is increased by making the focal length $F_3$ of the third lens group $G_3$ larger than the focal length $F_1$ of the first lens group $G_1$.

Figure 2:
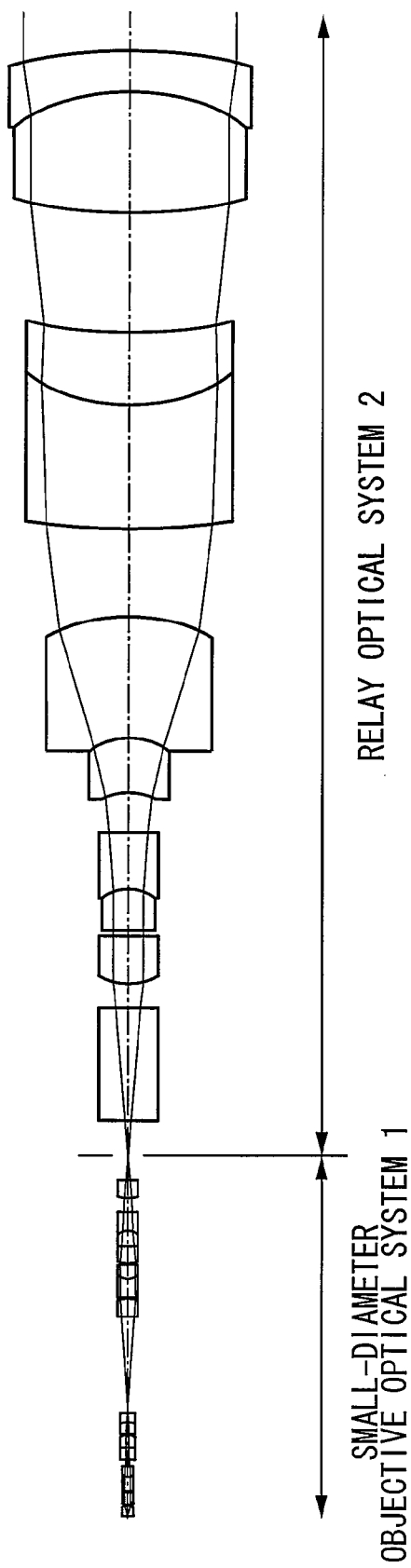
FIG. 2 is a lens layout in which an infinity-design relay optical system is disposed at an image side of the small-diameter objective optical system in FIG. 1.
Figure 3:
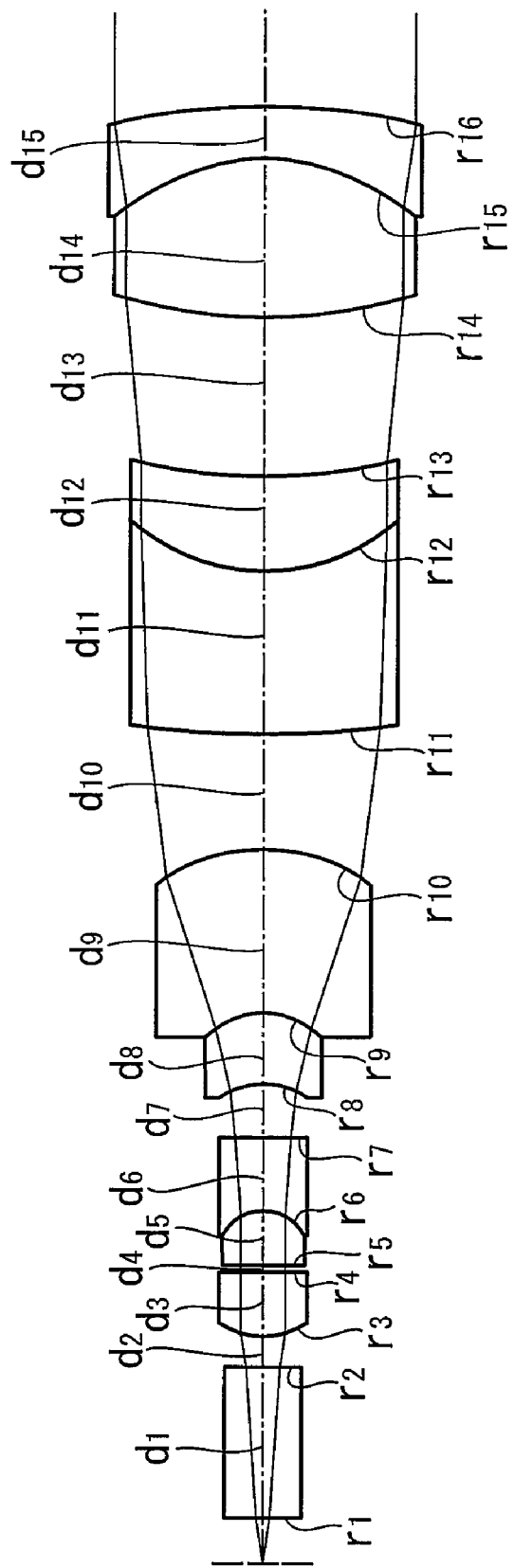
FIG. 3 is a lens diagram of the relay optical system in FIG. 2.

FIG. 2 is lens layout in which a relay optical system 2 is disposed at the image plane side of the small-diameter objective optical system 1 in FIG. 1, to make the beam emerging from the object substantially collimated. FIG. 3 shows an example lens diagram of the relay optical system 2, and Table 1 shows example lens data of the relay optical system 2. In FIG. 3 and Table 1, symbol r represents the radius of curvature, symbol d represents the distance between surfaces, symbol $n_d$ represents the refractive index at the d-line (587.56 nm), and symbol $v_d$ represents the Abbe number at the d-line (587.56 nm).

TABLE 1

|  | r | d | nd | vd |
|---|---|---|---|---|
| OBJECT PLANE | | | | |
| 1 | ∞ | 4.67 | 1.7725 | 49.6 |
| 2 | ∞ | 1 | | |
| 3 | 2.385 | 2 | 1.43875 | 94.93 |
| 4 | ∞ | 0.2 | | |
| 5 | ∞ | 1.73 | 1.43875 | 94.93 |
| 6 | −1.462 | 2.34 | 1.6779 | 55.34 |
| 7 | ∞ | 1.7 | | |
| 8 | −2.339 | 2.23 | 1.43875 | 94.93 |
| 9 | −2.339 | 5.17 | 1.7725 | 49.6 |
| 10 | −6.021 | 3.63 | | |
| 11 | 24.102 | 5.16 | 1.51633 | 64.14 |
| 12 | 6.202 | 3 | 1.6779 | 55.34 |
| 13 | 15.002 | 5 | | |
| 14 | 16.326 | 5 | 1.43875 | 94.93 |
| 15 | −7.205 | 1.7 | 1.7725 | 49.6 |
| 16 | −16.508 | | | |
| IMAGE PLANE | | | | |

With the configuration in FIG. 2, it is possible to make the small-diameter objective optical system 1 according to this embodiment compatible with infinity-design microscope systems. By designing the system so that the beam diameter on the small-diameter objective optical system side of the relay optical system 2 is small, it is possible to insert the objective optical system of the present invention to a deeper site inside a living organism with minimal invasiveness.

Figure 4:
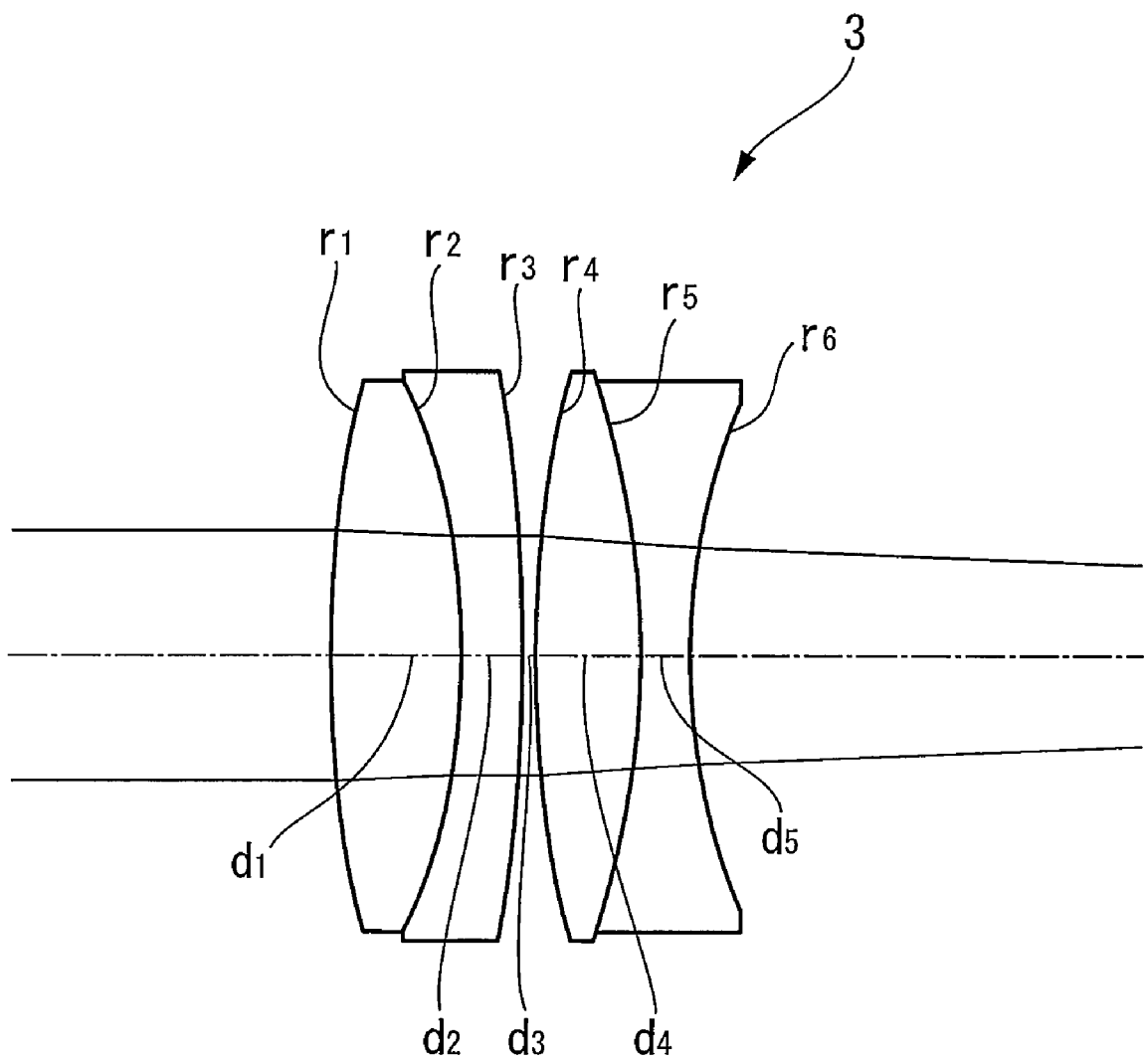
FIG. 4 is a sectional lens diagram showing an example of an image forming lens disposed at the image side of the infinity-design relay optical system in FIG. 2.

When the relay optical system 2 is disposed at the image plane side of the small-diameter objective optical system 1, as shown in FIG. 2, the light emitted towards the image plane side of the relay optical system 2 is collimated and thus does not form an image. Therefore, an image forming lens 3 (focal length, 180) described by the lens data in Table 2, shown in FIG. 4, is disposed at the image plane side of the relay optical system 2 to provide the image.

TABLE 2

|  | r | d | nd | vd |
|---|---|---|---|---|
| OBJECT PLANE | | | | |
| 1 | 68.7541 | 7.7321 | 1.48749 | 70.21 |
| 2 | −37.5679 | 3.4742 | 1.8061 | 40.95 |
| 3 | −102.8477 | 0.6973 | | |
| 4 | 84.3099 | 6.0238 | 1.834 | 37.17 |
| 5 | −50.71 | 3.0298 | 1.6445 | 40.82 |
| 6 | 40.6619 | | | |
| IMAGE PLANE | | | | |

EXAMPLES

Example 1

Example 1 of the present invention will now be described using the small-diameter objective optical system shown in FIG. 1. Table 3 is the lens data for the small-diameter objective optical system in FIG. 1. FIGS. 5A to 5D are aberration curves for the small-diameter objective optical system in FIG. 1. In FIGS. 5A to 5D, reference symbol NA indicates the numerical aperture at the object plane, and reference symbol Y indicates the object height.

TABLE 3

|  | r | d | nd | νd |
|---|---|---|---|---|
| OBJECT PLANE | ∞ | 0.02 (working distance) | 1.33304 (water) | 55.79 |
| 1 | ∞ | 0.44 | 1.883 | 40.76 |
| 2 | −0.4017 | 0.01 |  |  |
| 3 | 0.5346 | 0.55 | 1.883 | 40.76 |
| 4 | ∞ | 0.03 |  |  |
| 5 | ∞ | 0.61 | 1.48749 | 70.23 |
| 6 | 0.4786 | 0.44 | 1.883 | 40.76 |
| 7 | ∞ | 0.3 |  |  |
| 8 | −0.4933 | 0.5 | 1.755 | 52.32 |
| 9 | ∞ | 0.51 | 1.48749 | 70.23 |
| 10 | −0.5591 | 0.02 |  |  |
| 11 | ∞ | 0.53 | 1.755 | 52.32 |
| 12 | −0.9021 | 0.36 | 1.48749 | 70.23 |
| 13 | ∞ | 4.09 |  |  |
| 14 | ∞ | 0.75 | 1.48749 | 70.23 |
| 15 | −1.4212 | 0.03 |  |  |
| 16 | ∞ | 0.78 | 1.883 | 40.76 |
| 17 | 0.5625 | 0.63 | 1.755 | 52.32 |
| 18 | ∞ | 0.03 |  |  |
| 19 | 1.0076 | 0.71 | 1.48749 | 70.23 |
| 20 | ∞ | 0.03 |  |  |
| 21 | ∞ | 0.63 | 1.755 | 52.32 |
| 22 | −0.5598 | 0.78 | 1.883 | 40.76 |
| 23 | ∞ | 0.59 |  |  |
| 24 | 1.4267 | 0.75 | 1.48749 | 70.23 |
| 25 | ∞ | 0.92 |  |  |

The lens diameters of $L_1$ to $L_4$ are 0.46 mm, the lens diameter of $L_5$ to $L_8$ are 0.6 mm, and the lens diameters of $L_9$ to $L_{15}$ are 0.82 mm; thus the small-diameter objective optical system 1 according to Example 1 is constructed only of lenses with extremely small diameters.

Therefore, the small-diameter objective optical system 1 of this Example is suitable for in vivo observation of a region deep inside the body of a small laboratory animal, such as a mouse, over a comparatively long period of time with minimal invasiveness.

Example 2

Figure 6:
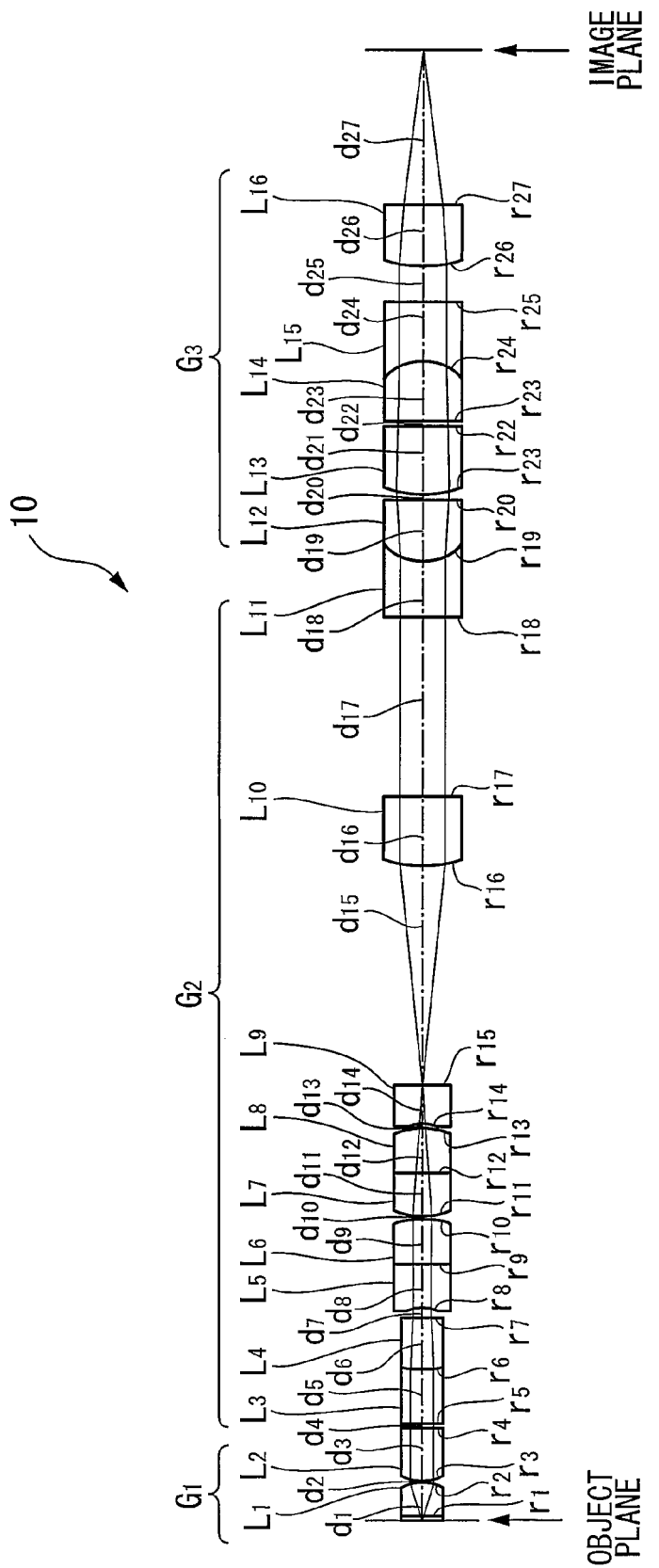
FIG. 6 is a lens diagram according to Example 2 of the small-diameter objective optical system.
Figure 7A:
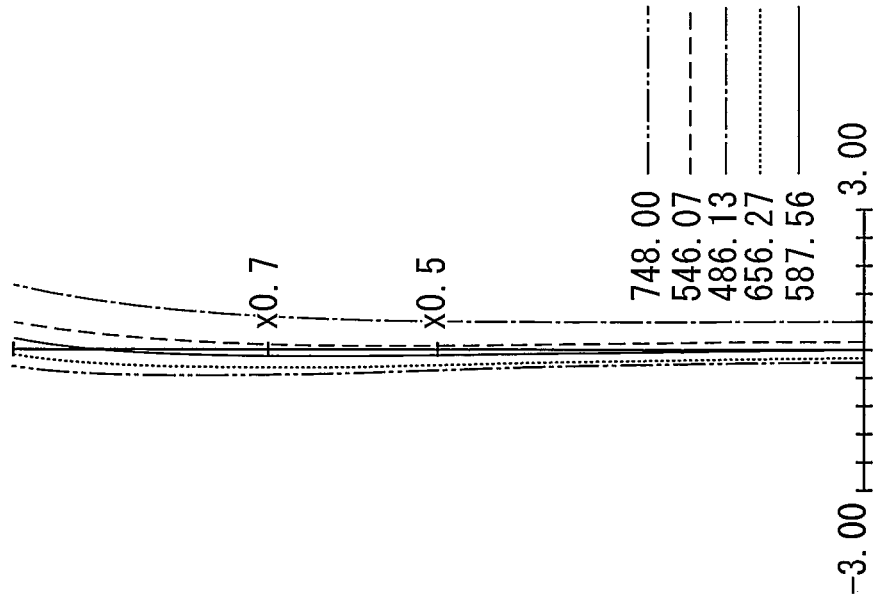
FIG. 7A is an aberration diagram of the small-diameter objective optical system of Example 2, showing spherical aberration.
Figure 7B:
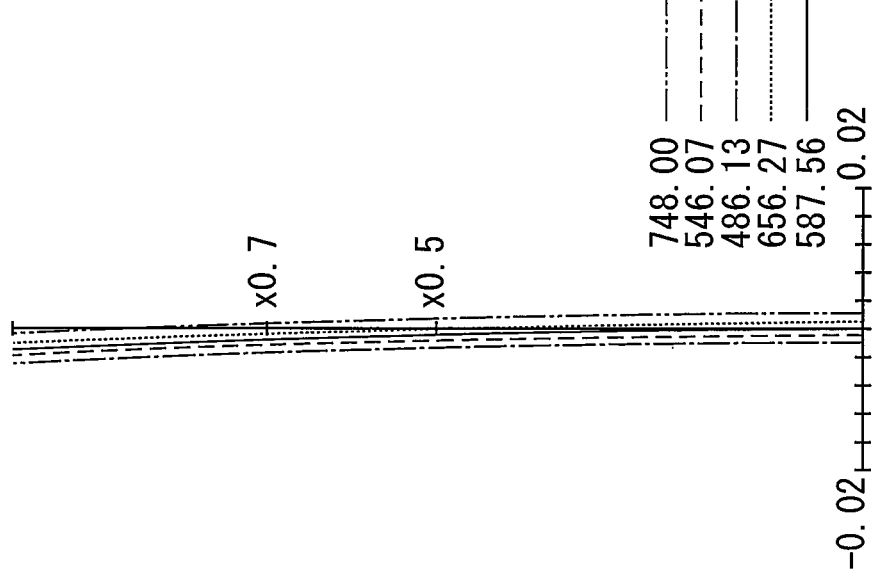
FIG. 7B is an aberration diagram of the small-diameter objective optical system of Example 2, showing the amount of the offense against the sine condition.
Figure 7C:
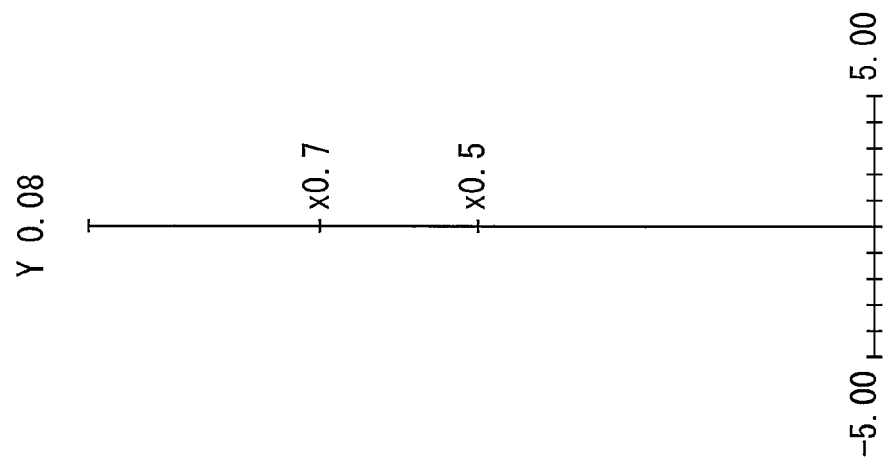
FIG. 7C is an aberration diagram of the small-diameter objective optical system of Example 2, showing astigmatism.
Figure 7D:
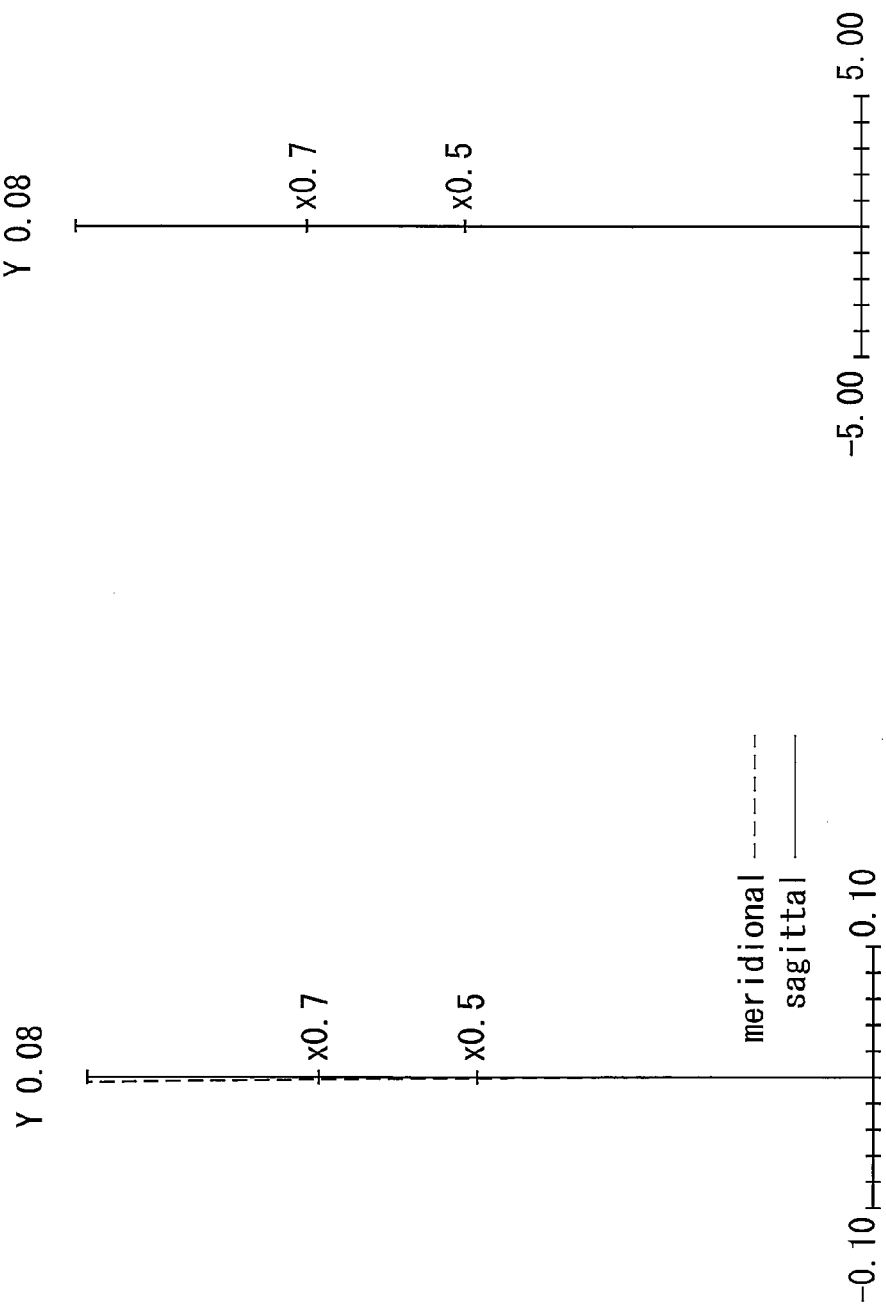
FIG. 7D is an aberration diagram of the small-diameter objective optical system of Example 2, showing distortion.

FIG. 6 is a lens diagram of Example 2 of the small-diameter objective lens according to the present invention. The small-diameter objective lens 10 according to Example 2 has a longer working distance WD than that of Example 1. Accordingly, it is possible to perform observation without contacting the tip of the lens with the observation target, so as not to physically affect the living organism.

Table 4 shows the lens data for the small-diameter objective optical system in FIG. 6. FIGS. 7A to 7D show aberration curves for the small-diameter objective optical system in FIG. 6. The reference symbols in FIGS. 6, 7A to 7D and Table 4 are the same as those in Example 1.

TABLE 4

|  | r | d | nd | νd |
|---|---|---|---|---|
| OBJECT PLANE | ∞ | 0.05 (working distance) | 1.33304 (water) | 55.79 |
| 1 | ∞ | 0.4 | 1.883 | 40.76 |
| 2 | −0.3821 | 0.01 |  |  |
| 3 | 0.534 | 0.6 | 1.883 | 40.76 |
| 4 | ∞ | 0.04 |  |  |
| 5 | ∞ | 0.61 | 1.48749 | 70.23 |
| 6 | 0.998 | 0.6 | 1.883 | 40.76 |
| 7 | ∞ | 0.1 |  |  |
| 8 | −0.4761 | 0.51 | 1.48749 | 70.23 |
| 9 | ∞ | 0.5 | 1.755 | 52.32 |
| 10 | −1.1993 | 0.02 |  |  |
| 11 | 0.7012 | 0.51 | 1.48749 | 70.23 |
| 12 | ∞ | 0.5 | 1.755 | 52.32 |
| 13 | −0.7257 | 0.05 |  |  |
| 14 | −0.4761 | 0.45 | 1.883 | 40.76 |
| 15 | ∞ | 2.5 |  |  |
| 16 | 1.2859 | 0.8 | 1.48749 | 70.23 |
| 17 | ∞ | 2.07 |  |  |
| 18 | ∞ | 0.65 | 1.883 | 40.76 |
| 19 | 0.4931 | 0.71 | 1.755 | 52.32 |
| 20 | ∞ | 0.03 |  |  |
| 21 | 1.147 | 0.8 | 1.48749 | 70.23 |
| 22 | ∞ | 0.03 |  |  |
| 23 | ∞ | 0.71 | 1.755 | 52.32 |
| 24 | −0.4931 | 0.65 | 1.883 | 40.76 |
| 25 | ∞ | 0.42 |  |  |
| 26 | 0.9151 | 0.7 | 1.48749 | 70.23 |
| 27 | ∞ | 1.76 |  |  |

The lens diameters of $L_1$ to $L_4$ are 0.46 mm, the lens diameter of $L_5$ to $L_9$ are 0.6 mm, and the lens diameters of $L_{10}$ to $L_{16}$ are 0.8 mm; thus the small-diameter objective optical system 10 according to this Example is constructed only of lenses with extremely small diameters.

Therefore, the small-diameter objective optical system 10 of this Example is suitable for in vivo observation of biological tissue, such as cells and muscle tissue, or various internal organs, such as the heart and liver, and particularly brain tissue, of mammals, including small laboratory animals, over a comparatively long period of time with minimal invasiveness.

Table 5 shows data for conditional expressions (1) to (6) in Example 1 and Example 2.

TABLE 5

|  |  | Example 1 | Example 2 |
|---|---|---|---|
| $F_1$ |  | 0.262 | 0.255 |
| $F_3$ |  | 2.815 | 2.13 |
| $h_1$ |  | 0.244 | 0.23 |
| $h_3$ |  | 0.611 | 0.472 |
| $D_1$ |  | 0.46 | 0.46 |
| NA |  | 0.465 | 0.459 |
| $R_1$ |  | 0.4017 | 0.3821 |
| $n_1$ |  | 1.883 | 1.883 |
| $d_1$ |  | 1.02 | 1.06 |
| $ν_{31}$ |  | 52.32 | 52.32 |
| $ν_{32}$ |  | 40.76 | 40.76 |
| $n_{31}$ |  | 1.755 | 1.755 |
| $n_{32}$ |  | 1.883 | 1.883 |
| $R_3$ |  | 0.56 | 0.4931 |
| conditional | (1) | 0.23 | 0.246 |
| expressions | (2) | 0.28 | 0.29 |
|  | (3) | 2.2 | 2.3 |
|  | (4) | 11.56 | 11.56 |
|  | (5) | 0.128 | 0.128 |
|  | (6) | 5.03 | 4.32 |

The small-diameter objective optical system of the present invention exhibits superior aberrations up to the near-infrared region. Therefore, using near-infrared light, it is possible to observe not only at the skin surface of a specimen, but also inside the body, with comparatively low scattering. In addition, the small-diameter objective optical system of the present invention can be used in a multiphoton-excitation observation device.

What is claimed is:

1. A small-diameter objective optical system comprising, in order from an object plane:

a first lens group with positive refractive power, including at least one plano-convex lens whose convex surface faces an image plane;

a second lens group with positive refractive power, including at least one concave lens; and a third lens group including a cemented lens of which a cemented surface has negative refractive power, wherein the focal length of the third lens group is larger than the focal length of the first lens group and conditional expression (1) below is satisfied:

$$0.2 < (F_1 \times h_3)/(F_3 \times h_1) < 0.3 \qquad (1)$$

where $F_1$ is the focal length of the first lens group, $F_3$ is the focal length of the third lens group, $h_1$ is a beam diameter of a substantially collimated beam at the first lens group side of the second lens group, and $h_3$ is a beam diameter of a substantially collimated beam at the third lens group side of the second lens group.

2. A small-diameter objective optical system comprising; in order from an object plane:

a first lens group with positive refractive power, including at least one piano-convex lens whose convex surface faces an image plane;

a second lens group with positive refractive power, including at least one concave lens; and a third lens group including a cemented lens of which a cemented surface has negative refractive power, wherein the focal length of the third lens group is larger than the focal length of the first lens group and conditional expressions (2) and (3) below are satisfied:

$$0.25 < (D_1 \times NA)/(R_1 \times n_1) < 0.35 \qquad (2)$$

$$1.5 < d_1/D_1 < 2.5 \qquad (3)$$

where $D_1$ is a smallest lens diameter in the first lens group,

NA is a numerical aperture at the object plane side of the small-diameter objective optical system, $R_1$ is a smallest radius of curvature in the first lens group, $n_1$ is a largest refractive index in the first lens group, $d_1$ is a distance from the object plane to an image plane of a lens at the extreme image plane side in the first lens group.

3. A small-diameter objective optical system comprising, in order from an object plane:

a first lens group with positive refractive power, including at least one piano-convex lens whose convex surface faces an image plane;

a second lens group with positive refractive power, including at least one concave lens; and a third lens group including a cemented lens of which a cemented surface has negative refractive power, wherein the focal length of the third lens group is larger than the focal length of the first lens group and conditional expressions (4), (5), and (6) below are satisfied:

$$10 < |v_{31} - v_{32}| \qquad (4)$$

$$0.12 < |n_{31} - n_{32}| < 0.2 \qquad (5)$$

$$4 < F_3/R_3 < 5.5 \qquad (6)$$

where $v_{31}$ is a d-line Abbe number of a lens with a large Abbe number in the cemented lens of the third lens group, $v_{32}$ is a d-line Abbe number of a lens with a small Abbe number in the cemented lens of the third lens group, $n_{31}$ is a d-line refractive index of the lens with the large Abbe number in the cemented lens of the third lens group, $n_{32}$ is a d-line refractive index of the lens with the small Abbe number in the cemented lens of the third lens group, $F_3$ is the focal length of the third lens group, and $R_3$ is a radius of curvature of the cemented surface in the cemented lens of the third lens group.

* * * * *